Feb. 3, 1970   H. B. IRVIN   3,493,470
VOLATILE COMPONENTS BY VAPORIZATION WHILE MAINTAINING THE
DESIRED RATE OF VAPORIZATION BY OVERHEAD FLOW CONTROL
Filed May 27, 1966
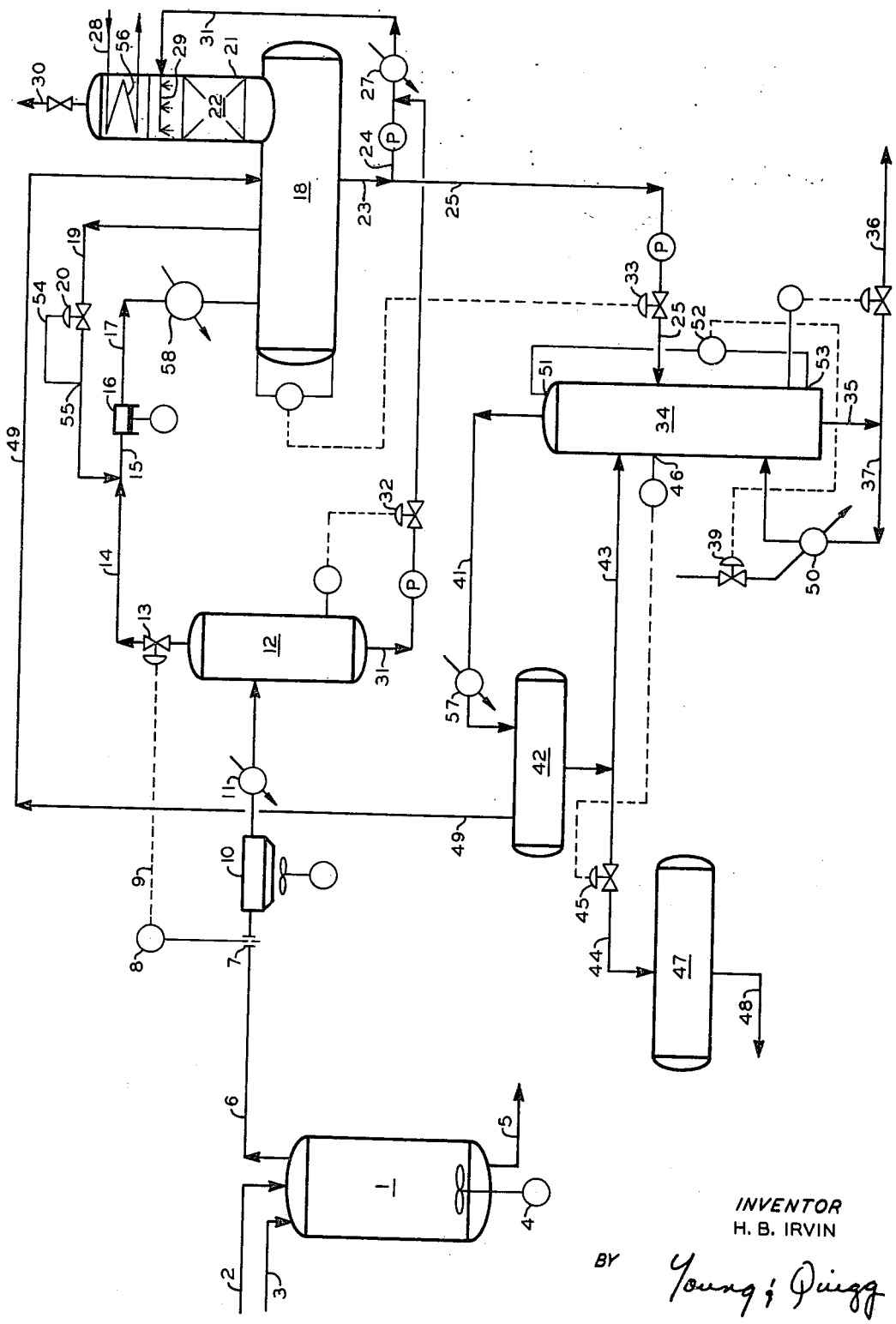
INVENTOR
H. B. IRVIN
BY
Young & Quigg
ATTORNEYS United States Patent Office 3,493,470
Patented Feb. 3, 1970

3,493,470
VOLATILE COMPONENTS BY VAPORIZATION WHILE MAINTAINING THE DESIRED RATE OF VAPORIZATION BY OVERHEAD FLOW CONTROL
Howard B. Irvin, Bartlesville, Okla., assignor to Phillips Petroleum Company, a corporation of Delaware
Filed May 27, 1966, Ser. No. 553,422
Int. Cl. B01d 3/42, 3/34, 53/14
U.S. Cl. 203—2                                9 Claims

ABSTRACT OF THE DISCLOSURE

Relatively more highly volatile materials are recovered from the liquid phase comprising at least two volatile components by governing the rate of vapor removal from a vapor phase overlying the liquid phase in response to the pressure drop across a restricted section in the vapor exit from the system so as to maintain that pressure drop at a predetermined, substantially constant value.

---

This invention relates to a method and apparatus for governing the vaporization of mixtures comprising more than one volatile component. In one aspect of this invention, volatile materials having dissimilar volatility are vaporized by reducing the pressure over the system at a controlled rate. In another aspect, the vaporization of hydrocarbon mixtures is controlled by maintaining a substantially constant differential pressure across a fixed section in the vapor exit line from the system. In yet another aspect, the vaporization rate of hydrocarbon mixtures is controlled by governing the vapor exit rate from a closed system containing said mixture so as to maintain constant differential pressure across a fixed section in the vapor exit from the system. In yet another aspect, hydrocarbon mixtures are vaporized in batch operation and the rate of such vaporization is controlled to maintain a constant pressure drop across the fixed section in the system exit by partially condensing the vaporized components and collecting the vapor and liquid phases thus formed in an accumulator and controlling the rate of vapor removal from said accumulator in response to the pressure drop across said fixed section in said first exit line so as to maintain said pressure drop at a predetermined constant value.

The recovery of hydrocarbons from mixtures thereof comprising relatively volatile hydrocarbons or mixtures of volatile hydrocarbons and relatively non-volatile material can, of course, be readily accomplished in degree by either heating the mixtures or reducing the pressure thereon. However, where this vaporization is relatively rapid the composition of the vapor phase removed exhibits substantial departure from the equilibrium compositions that would be expected. Particularly in batch operations where vaporization is accomplished by rapidly reducing the system pressure, the less volatile constituents tend to flash when the pressure reduction is substantial with the consequence that the degree of removal of more volatile components is substantially reduced. In addition, in systems where it is desirable due to considerations of either necessity, practicality or convenience to avoid the addition of heat to accomplish the desired degree of vaporization, the degree of recovery of volatile hydrocarbon is substantially reduced in the absence of adequate control of the batch operation. Another important consideration in the recovery of the volatile hydrocarbons from mixtures thereof with relatively non-volatile materials is the fact that the compositions of the vapor phase removed during such batch opertaions is variant in that the amount of more highly volatile components in the liquid phase and consequently in the vapor phase is substantially reduced as the vaporization progresses with the result that the vapor phase becomes more highly concentrated in the less volatile constituents. As the control of such systems must necessarily be governed in response to these transient characteristics of the vapor phase it is necessary to employ in the control of such batch operations a system adequate to accommodate these variations and govern the vaporization from start to finish in a predetermined manner so as to realize the desired recovery.

For example, such systems are of substantial importance in the recovery of diluent and unreacted monomer in batch polymerization operations. For instance, following completion of the batch polymerization of butadiene in systems employing butadiene feed streams containing relatively high concentrations of butenes, it is desirable to increase polymer concentration by removing a substantial amount of the diluent and unreacted monomer without the necessity of supplying additional heat to the system for accomplishing this purpose. At the same time, for purposes of recovering and purifying both monomer and diluent, it is desirable to achieve an optimum recovery of these constituents by taking advantage of the pressure and temperature of the polymerization system at its termination.

Consequently, it is an object of this invention to achieve an optimum recovery of relatively volatile material from mixtures thereof comprising at least two volatile components. It is another object of this invention to accomplish the batch vaporization of mixtures comprising at least two relatively volatile constituents so that an optimum recovery of volatile material is achieved. It is another object of this invention to provide a method and apparatus for governing the batch vaporization of mixtures comprising more than one volatile component, by controlling the vaporization in a predetermined manner in response to variations in the physical characteristics of the system. It is another object of this invention to provide a process and apparatus for the vaporization and recovery of volatile materials in an optimum manner automatically while making optimum use of the apparatus involved.

In accordance with one embodiment of this invention, a mixture comprising more than one relatively volatile component is at least partially vaporized at conditions of elevated temperature and pressure by gradually reducing the pressure on the system in an automatic and predetermined manner without the necessity of adding additional heat to the system whereby the volatilization and recovery of a substantial part of each relatively volatile component is realized while the relatively selective volatilization of the less highly volatile components is minimized.

More specifically in accordance with one embodiment of this invention, a mixture comprising a substantial amount of at least two hydrocarbons having from about 3 to about 8 carbon atoms per molecule is gradually vaporized at an automatically controlled rate by governing the rate of removal of vaporized material from the vapor phase over the system in response to the pressure drop across a section in the vapor exit from the system so as to maintain that pressure drop at a predetermined, substantially constant value. The vaporized material is cooled to condense a part of the heavier components therein and collected in a suitable vessel from which vaporized material is removed at a rate controlled so as to maintain said constant pressure drop at the desired value. The vapors are then compressed and cooled to condense a part thereof which are collected in a second accumulator with provision for recycling vapor from the second accumulator to the compressor at a rate controlled in response to the inlet pressure to the compressor. Part of the vapor phase leaving the second accumulator is scrubbed with condensed materials collected in the first and second accumulators to remove condensible materials from non-condensible gases vented from the system. The liquid phase thus produced can be passed to storage or, if desired, it can be fractionated to separate and recover the dissimilar materials of which it is comprised.

The vaporization and recovery system which is the subject of this invention is particularly adaptable to the recovery of diluent and unreacted monomer following the termination of batch polymerization operations. For this reason, the method and apparatus of this invention will be described in detail with reference to such a polymerization system involving the polymerization of a low concentration butadiene stream. However, it should be observed that this mode of disclosure and illustration should not limit the application of the concept of this invention to this particular embodiment.

As shown in FIGURE 1, the invention is illustrated in combination with the removal of diluent and monomers and recovery of the same from a batch polymerization process which can, as in this particular case, comprise the polymerization of a low concentration butadiene stream in a suitable solvent such as cyclohexane or n-hexane. On completion of the latch polymerization, it is desirable to concentrate the polymer solution to alleviate the necessity of handling the major portion of the diluent and unreacted monomers in the polymer recovery and purification circuit. The concept of this invention provides a method and apparatus by which this concentration can be accomplished by utilizing the pressure and temperature of the polymerization system upon the completion of reaction to effect the controlled volatilization of a substantial part of both diluent and unreacted monomers. In this particular application, the concept of this invention affords a substantial economic advantage to the overall operation in that it provides that the vapors removed by such controlled volatilization are condensed and separated to provide a diluent fraction suitable for recycle to subseqeunt batch polymerization operations and a butene-rich stream of suitable purity for subsequent use as a by-product.

The vapors flashed from reactor 1 are passed by way of pipe 6 via orifice 7 and suitable coolers 10 and 11 to a first accumulating vessel 12 wherein a part of the higher molecular weight components, cyclohexane in this particular case, are collected as liquid phase and removed by way of pipe 31 at a rate controlled in response to the liquid level in the accumulator by suitable valve means 32. The flow rate from the reactor, and consequently the rate of pressure reduction on the system, is controlled by governing the rate at which vapors are removed from accumulator 12 via line 14 such control being accomplished by suitable flow control means 13. Control means 13 communicates with a suitable pressure differential metering device 8 by way of control line 9 so that the response of controller 13 is such that a substantially constant pressure drop is maintained across orifice 7. Since this flow control system is regulated to maintain a substantially constant pressure drop across the orifice, the flow rate in line 6 varies with the density of the vapors removed as approximated by the expression $\omega = K\sqrt{\rho \Delta P}$ where $\omega$ is mass flow rate, K is a constant for a given orifice system (neglecting small variations in K in response to variations $C_p/C_v$ and $P_2/P_1$), $p$ is the density of the fluid, $\Delta P$ is the measure of the pressure differential across the orifice and $P_2$ and $P_1$ are the pressures exerted by vapors in pipe 6 immediately upstream and downstream, respectively, of orifice 7. The vapors removed from accumulator 12 contain about 30 percent cyclohexane at the beginning of a cycle and about 65 percent cyclohexane at the end of the cycle. These vapors are passed via pipes 14 and 15 to suitable compression means 16 wherein the mixture comprising cyclohexane and butylenes is compressed to a pressure of about 40 p.s.i.a. at a temperature of about 150° F. after which the mixture is cooled to a temperature of about 100° F. in suitable cooling means 58 and passed to a second accumulator 18. A part of the vapor existing in accumulator 18 is passed by way of pipe 19 as recycle to the compression and cooling means just described. The flow rate of this recycle stream is controlled in response to the pressure in the recycle line at point 55 which pressure substantially approximates the pressure in the overhead exit line from accumulator 12 downstream of valve 13. This pressure indication is relayed by way of line 54 to suitable flow control means 20 for the purpose of controlling the recycle rate as described. The remainder of the vapor phase in accumulator 18 can be passed upward through suitable scrubbing means 21 wherein the vapors are contacted with liquid phase hydrocarbon introduced to the column by way of pipe 31 and distributing means 29. The scrubber can further comprises suitable gas liquid contacting devices 22 such as Raschig rings for the purpose of effecting intimate contact between the uprising vapor phase and the absorbent liquid phase. Where relatively highly volatile components are to be recovered as in this particular case, it is also desirable to provide additional cooling means 56 in the upper part of the absorption zone above the point of liquid introduction to the column. In the preferred embodiment of this invention, this cooling step is accomplished by indirect heat exchange between the rising vapors and suitable conduit means 28 through which refrigerant is passed. Non-condensible materials such as nitrogen derived from the nitrogen blanket over the polymerization system and a small part of the more highly volatile material not absorbed in the absorption column are emitted from column 21 via pipe 30 preferably at a rate governed by suitable back pressure control means so as to maintain the desired pressure in the system.

The liquid hydrocarbon used as absorbent in this particular embodiment is preferably derived from the liquid phase collected in both accumulators 12 and 18. The liquid phase from accumulator 12 comprising, in this embodiment, a high concentration of cyclohexane is passed by way of pipe 31 into admixture with a part of liquid phase derived from accumulator 18 by way of pipes 23 and 24. This mixture is then cooled, preferably in an indirect heat exchanger 27, and is passed again by way of pipe 31 into the absorption column 21 as previously described. The remainder of a liquid phase from large accumulator 18, containing substantially constant relative amounts of cyclohexane and butylenes is passed by way of pipe 25 at a controlled rate and is introduced at an intermediate point to a fractionation zone 34. This flow rate is controlled by conventional liquid level control means and a suitable flow controller 33 so as to maintain a predetermined liquid level in accumulator 18. The overhead from fractionator 34, comprising primarily a butylenes fraction, is passed by way of pipe 41 and cooler 57 to a suitable accumulator 42 from which vaporous material is returned to accumulator 18 by way of pipe 49. A part of the liquid phase accumulated in vessel 42 is passed by way of pipe 43 as recycle to fractionator 34. The remainder of this liquid phase is passed by way of pipe 44 at a controlled rate to a suitable accumulator 47 from which it is removed as butylenes by-product via pipe 48. The flow rate through pipe 44 is controlled in response to the temperature in fractionator 34 at a suitable intermediate point 46 which temperature governs the operation of a suitable flow control valve in pipe 44. In the preferred mode of operation, the rate of by-product removal is controlled inversely in response to the temperature of the column so that the rate of recycle to the fractionation zone increases as column temperature increases.

The bottoms product from fractionator 34 is removed by way of pipe 35 and can be passed by way of pipe 36 to diluent storage or a subsequent polymerization zone. A part of this bottoms product comprising, in this particular embodiment, primarily cyclohexane, is passed by way of pipe 37 and controlled heating means 50 as recycled to fractionator 34. The recycled rate to the fractionator is determined inversely in response to the rate of product removal via pipe 36 since the product removal rate is governed in response to the liquid level in the lower part of the fractionation zone. The heat supply to reboiler 50 is controlled inversely in response to the pressure differential across column 34. In the preferred embodiment, this control is accomplished by governing the rate of supply of heating medium, preferably steam, passed to reboiler 50 by way of pipe 38 by suitable flow control means 39. The operation of the flow controller is governed by differential pressure sensing means 52 which serves to determine the pressure differential between two predetermined elevations 51 and 53 in fractionator 34. As a result, the heat supplied to the reboiler is increased as the pressure differential over the column is decreased so as to maintain a predetermined degree of balance in the fractionation zone which is necessitated by the variation in composition and flow rate of the feed to the fractionator 34 as the batch vaporization proceeds.

During the progress of the described batch volatilization the density ($\rho$) of the vapor removed from the reactor is reduced primarily due to the reduction in pressure on the system. For example, in one such operation in which the reactor solution contained 70.0 weight percent cyclohexane, 18.5 weight percent butylenes, and 11.5 weight percent solids at an initial pressure of about 120 p.s.i.a., the system pressure was gradually reduced to 16 p.s.i.a. resulting in a vapor density change of from about 1 to about 0.17 pound per cubic foot and a commensurate variation in the reactor overhead mass flow rate of from about 247 to about 100 pounds per minute. However, as the volatilization progresses the molecular weight of the vapors removed gradually increases due to the increasing amount of lower boiling materials, particularly cyclohexane, present in the effluent.

The flow control system described, being relatively inexpensive, provides a substantial advantage in such applications in that it alleviates the necessity of large equipment sizes and serves to reduce operating costs thereby. At the beginning of the vaporization step when the overhead flow rate and pressure in pipe 6 are the greatest, substantially all of the vapors removed are condensed in coolers 10 and all at a relatively high differential temperature over these heat transfer surfaces. Therefore, during the initial stages of the operation where the heat load on the system is at a maximum due to the fact that both temperature and flow rates are maximum during this period, advantage is taken of the high differential temperature across the overhead cooler so that relatively small heat transfer surface is required thereby reducing the cost of necessary equipment in this respect. Depending upon the desired rate of volatilization, the overhead flow rate may be controlled during the initial stages of the operation by the orifice 7 and control valve 13 combination. However, this flow rate may also be controlled by condensing and cooling capacity of the overhead heat exchangers 10 and 11. However, as the operation proceeds these last mentioned cooling and condensing means condense a smaller portion of the vapors in the reactor overhead stream because of the reduced pressure on the system. Flow control valve 13 in the vapor exit line from accumulator 12 will then partially open to allow the passage of butylene-rich vapors from the accumulator at a controlled rate into the suction of compressor 16. As vaporization continues, i.e., as pressure and temperature drop and molecular weight of the vapors from the reactor increases, the flow control valve 13 will continue to open thereby allowing a higher volume flow rate in the overhead line from the first accumulator in order to maintain the desired differential pressure across orifice 7 so that near the end of the operation the compressor 16 is handling the maximum volume of vapors from the first accumulator. Toward the end of the batch operation, the mass flow rate of vapor leaving the reactor is at a minimum due to instrument 8 attempting to maintain the constant differential pressure across orifice 7. Therefore, the compressor is rate controlling only toward the end of the batch operation when the total mass flow rate is minimum, so that a relatively small compressor and after cooler are adequate.

As previously described, the flow control valve 20 in recycle line 19 is designed to control the volume flow rate inversely in response to the pressure in the vapor exit line from accumulator 12 downstream of control valve 13 and prevent the compressor from pulling a vacuum. Actually valve 20 acts to maintain a pressure of 16 p.s.i.a. at the compressor inlet. As a result, during the progress of the vaporization cycle, control valve 20 is gradually closed as the pressure in the reactor is reduced thereby effecting a lower rate of recycle of vapors from accumulator 18 through the compressor. Flow control valve 20 continues to close as the batch vaporization proceeds until it is completely closed near the end of the cycle, thereby allowing the compressor to draw substantially its complete load by way of vapor from tank 12. In the particular operation described where the vaporization of cyclohexane and butylenes is desired, the predetermined pressure at which controller 20 is completely closed is preferably about 16 p.s.i.a. This mode of operation serves to stabilize the system and thereby terminate the batch vaporization in spite of the fact that the differential pressure over the orifice falls below the predetermined constant value. At this point, the vaporization having been terminated, the vaporization control system can be switched through suitable manifold means to repeat the operation as described in the vaporization of the diluent, monomers and byproducts from other reactors.

In the preferred embodiment of this invention, all of the overhead recovery equipment runs continuously, including the reactor overhead compressor, although the effective load on each piece of equipment varies considerably throughout the cycle. Due to the application of the control systems as described, the system is completely automatic so that it is only necessary to switch the system back and forth between several reactors if desired by suitable system of manifolds. Although it is presently preferred that the system as described be applied to the batch vaporization of only one reactor at a time, the system will also work satisfactorily when receiving vapors from several sources simultaneously. In the latter described mode of operation, however, the time required to reduce pressure on the system to the desired predetermined value will necessarily be increased. Vapors from the compressor are preferably cooled and condensed before passing to the second accumulator 18. The compressor and after cooler combination as described is generally capable of effecting condensation of only a part of the vapors passed therethrough to the second accumulator. Most of the vapors remaining in the second accumulator are condensed and recovered by contacting them with recycle condensate in the absorption zone in direct communication with the second absorber as previously described. The previously described liquid recycle system which serves for recycling condensed liquid to the absorption column also aids in blending out fluctuations in compositions in the reactor overhead accumulator 18 resulting from composition variation in the vapor and the liquid streams to the second accumulator throughout the flash cycle. It is preferred that the second accumulator be large enough to contain the condensate received from several reactor batches in the mode of operation described so that the relatively short term composition fluctuations are substantially minimized so as to maintain a relatively stable feedstream to fractionator 34. Even though this mode of recycle operation is effected in substantially blending out the composition fluctuations, these variations are not completely eliminated and it is, therefore, necessary to provide sufficient instrumentation in the subsequent fractionation zone to accommodate for these variations in the feed composition. As a result, in one embodiment of this invention, the overhead product flow rate can be reset in response to the temperature in the column, preferably by the temperature at an elevation slightly above the point of feed introduction so as to enable the production of a distillate of uniformly low diluent level. The effect of this distillate control system is that the distillate product rate is reduced and thereby recycle rate is increased when the temperature of the column increases due to the presence of higher concentrations of higher boiling materials in the feed to the fractionation zone. Also, the rate at which heat is supplied to the fractionator reboiler 58 can be controlled or reset in response to the differential pressure over the column to maintain consistently high separation efficiency by providing a uniform loading of the packed section of the column under various feedstream rates, compositions, and temperatures.

Although the vaporization control and recovery system described is particularly applicable to the recovery of diluent, monomers and desirable by-products from batch polymerization operations, it should be observed that the application of the concept of this invention is not necessarily limited to such systems. In general, the system is suitable for removing and recovering several volatile hydrocarbons having dissimilar volatilities from solutions or mixtures comprising the same contained at a temperature and pressure sufficient to effect the volatilization of the desired constituents by reducing the pressure on the system. However, it is also within the concept of this invention that, if desired, additional heat in controlled amounts could be supplied to the solution or mixture from which the volatile constituents are to be derived so as to effect either a higher rate of vaporization or more complete recovery of the volatile components or both. However, a decided advantage of the recovery system as described is that it does not necessitate the application of additional heat to those systems contained at conditions sufficient to effect volatilization on a reduction of system pressure.

Numerous variations and modification of this invention will be apparent to one skilled in the art in view of the foregoing disclosure, drawing, and the appended claims to this invention, the essence of which is that there is provided a method and apparatus for effecting the vaporization and recovery of two or more relatively volatile constituents from a mixture containing the same by effecting said vaporization at a substantially controlled rate in response to the pressure drop across a fixed point in the vapor exit line so as to maintain said pressure differential at a predetermined constant value with provision for subsequently condensing and recovery of the vaporized material.

I claim:

1. A method for the selective vaporization and recovery of relatively more volatile components from a liquid phase comprising a plurality of volatile constituents remaining in a reaction zone at an elevated temperature and pressure upon completion of a reaction by controlling the vaporization in response to variations in the physical characteristics of the system which comprises:
   (a) reducing the pressure on said liquid phase without heat input to said zone to volatilize a portion of said volatile materials contained in said zone and form a vapor phase,
   (b) removing said vapor phase produced in step (a) from said zone and passing same through a restricted passage,
   (c) cooling said vapor phase to condense at least a portion thereof and form a first condensate and noncondensed vapors and passing same to an accumulation zone,
   (d) removing noncondensed vapors and condensate from said accumulation zone,
   (e) measuring the pressure drop across said restricted passage, and
   (f) maintaining a substantially constant pressure drop across said restricted passage during said vaporization by controlling the rate of flow of noncondensed vapors removed from said accumulation zone, the rate of flow of noncondensed vapors removed from said accumulation zone increasing as the vaporization progresses allowing a higher volume flow rate of noncondensed vapors in order to maintain the desired constant pressure drop across said restricted passage and compensate for the decrease in pressure and temperature within said reaction zone and an increase in molecular weight of vapors removed from said reaction zone as vaporization progresses.

2. The method of claim 1 further comprising:
   (g) compressing said noncondensed vapors downstream of said accumulation zone and said controlling,
   (h) cooling the thus compressed noncondensed vapors to condense a portion thereof to form a second condensate and compressed noncondensed vapors, and
   (j) recycling a portion of the compressed noncondensed vapors obtained in step (h) to the intake of said compressing in step (g) at a rate controlled in response to the pressure at said intake to maintain said pressure at a substantially constant value, the rate of recycle of compressed noncondensed vapors to said compressing decreasing as the vaporization proceeds until there is no recycling near the end of the vaporization, thereby allowing the compressing to draw substantially its complete load by way of noncondensed vapors removed from said accumulation zone.

3. The method of claim 1 further comprising:
   (g) cooling said noncondensed vapors removed from said accumulation zone to partially condense same and form a second condensate and a second noncondensed vapor phase and passing same to a second accumulation zone,
   (h) removing said second noncondensed vapor phase and said second condensate from said second accumulation zone, and
   (j) recycling at least a portion of said second noncondensed vapor phase into admixture with said noncondensed vapors removed from said accumulation zone upstream of said last partial condensation, the rate of said recycle being controlled in response to the pressure of said noncondensed vapors upstream of said last condensation.

4. The method of claim 3 wherein said volatilized material is hydrocarbon.

5. The method of claim 3 wherein said volatilized material comprises at least two hydrocarbons having from about 3 to about 8 carbon atoms per molecule.

6. The method of claim 5 wherein said volatile material comprises primarily hydrocarbons having from about 4 to about 6 carbon atoms per molecule.

7. The method of claim 3 wherein (k) the remainder of said second noncondensed vapor phase is contacted at absorption conditions with at least a part of said second condensate in admixture with said first condensate to separate at least a part of said second noncondensed vapor phase as absorbate from relatively non-condensible material in said second noncondensed vapor phase, said absorbate being returned into admixture with said second condensate, and said relatively non-condensible material being removed from the system.

8. The method of claim 6 wherein (k) said second condensate is fractionated to produce more volatile hydrocarbon as overhead product and less volatile hydrocarbon as bottoms product, (l) said overhead product is at least partially condensed to form a third condensate, (m) at least a part of said third condensate is removed from said system at a rate controlled in response to the temperature in said fractionation operation, and (n) the operation of said fractionation zone is further controlled by supplying heat thereto and governing the rate of such heat addition in response to the pressure drop across said fractionation zone.

9. An apparatus for governing the rate of vaporization of a mixture of at least two relatively volatile components having different volatilities comprising a closed vessel having vapor exit means in communication with cooling means, said vapor exit means further having therein restriction means for producing a pressure drop in response to fluid flow therethrough, said vapor exit means further having pressure sensing means in the vicinity of said restriction means for determining the pressure drop across said restriction means, said fluid conduit communicating between said cooling means and a first accumulator having liquid exit means in the lower part thereof and vapor exit means in the upper part thereof, fluid conduit communicating between said last vapor exit and compressing and cooling means, said last vapor exit means also having therein flow control means in control communication with said pressure sensing means, fluid conduit communicating between said last cooling means and a second accumulator having first vapor exit means in recycle communication with said compressing means, said first vapor exit means from said second accumulator further having therein flow control means in control communication with pressure sensing means downstream of said control means, said second accumulator further being in direct fluid communication with absorber means having cooling means and vapor exit means in the upper part thereof, said second accumulator further having liquid exit means in the lower part thereof in fluid communication with said absorber at an intermediate point below said last cooling means, fluid conduit communicating between said last liquid exit means and a fractionation zone, said liquid exit means from said first accumulator being in fluid communication with said absorber at said intermediate point, said absorber being in fluid communicating with the upper portion of said second accumulator, said fractionation zone having liquid exit means at the lower part thereof in fluid communication with liquid storage means and further in recycle communication with said fractionation zone through heating means for heating recycled liquid, said heating means having control means for governing the amount of heat supplied thereto, said last control means being in control communication with differential pressure sensing means in control communication with at least two pressure sensing means in the upper and lower parts of said fractionation zone for governing the heat supplied to said last heating means in response to the pressure drop across said fractionation zone, said fractionation zone further having vapor exit means in the upper part thereof in fluid communication with overhead accumulator means having vapor exit means and liquid exit means in fluid communication with a next accumulator for passing liquid from said overhead accumulator to said next accumulator, said last liquid exit means further having flow control means in control communication with temperature sensing means located at an intermediate point in said fractionation zone for controlling said last flow control means and the flow rate to said next accumulator in response to the temperature at said intermediate point, fluid recycle means in communication between said last exit means and said fractionation zone for recycling a part of the liquid removed from said overhead accumulator to said fractionation zone.

References Cited

UNITED STATES PATENTS

| | | | |
|---|---|---|---|
| 2,732,414 | 1/1956 | Stoops. | |
| 2,886,616 | 5/1959 | Mertz | 196—132 |
| 2,974,130 | 3/1961 | Moberly | 260—94.7 |
| 2,988,894 | 6/1961 | Van Pool et al. | |
| 3,024,171 | 3/1962 | Bone | 202—160 |
| 3,229,471 | 1/1966 | Palen et al. | 62—37 |
| 3,240,023 | 3/1966 | De Lano et al. | 202—160 |
| 3,266,260 | 8/1966 | Kelley | 196—132 |
| 3,318,102 | 5/1967 | Henderson | 62—21 |
| 3,359,185 | 12/1967 | Matta | 203—2 |

FOREIGN PATENTS 881,565  11/1961  Great Britain.

WILBUR L. BASCOMB, Jr., Primary Examiner

U.S. Cl. X.R.

55—21; 62—17, 21, 26; 196—132; 202—160, 206, 183; 203—1, 26, 42, 87, 98; 260—94.7, 666